Sept. 24, 1940.  L. E. MEENAN  2,216,086
ATTACHMENT FOR CONTOUR FARMING APPARATUS
Filed March 29, 1938   2 Sheets-Sheet 2

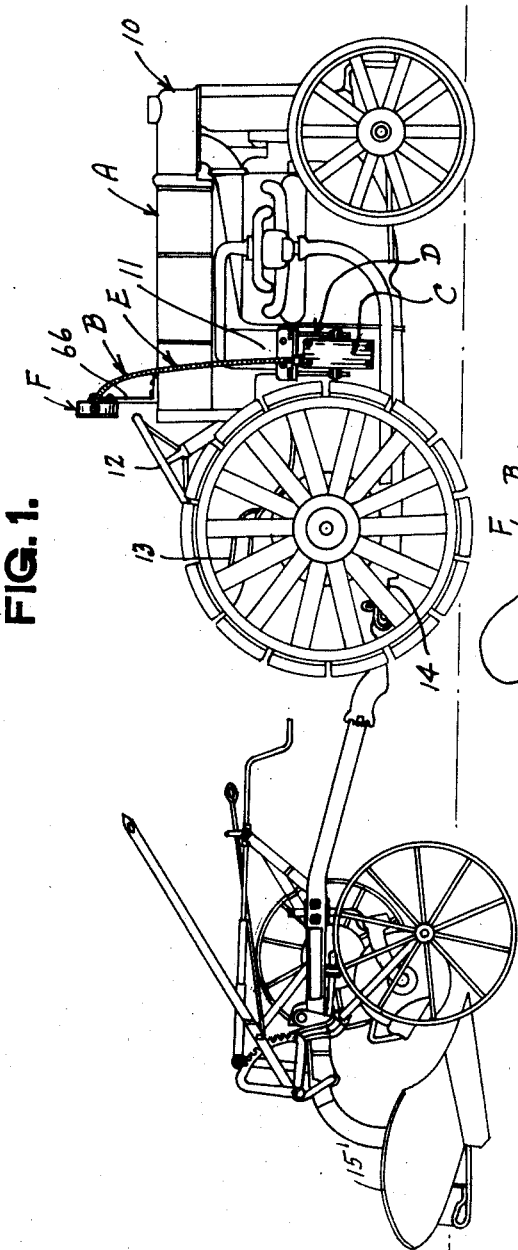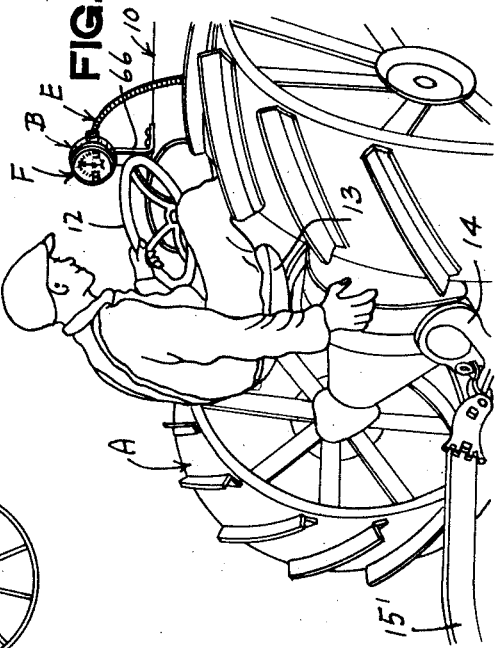

INVENTOR.
Leo E. Meenan
BY Lancaster, Allwine & Rommel
ATTORNEYS.

Patented Sept. 24, 1940

2,216,086

UNITED STATES PATENT OFFICE 2,216,086

ATTACHMENT FOR CONTOUR FARMING APPARATUS

Leo E. Meenan, Pawnee City, Nebr.

Application March 29, 1938, Serial No. 198,791

4 Claims. (Cl. 177—351)

This invention relates to improvements in level or grade indicating attachments for apparatus, such as a contour farming vehicle or implement.

In fields where there are slopes of sufficient inclination to cause appreciable run-off of water, the U. S. Soil Conservation Service recommends that all farming operations be done "on the contour," that is, by ploughing, harrowing, or otherwise working the land, as by movement of the implement over or thru the soil, along one or more lines or paths which do not deviate to any great extent from the level or contour of the land. By this procedure, troughs or ridges are formed which extend transversely of the direction of fall of the land, so as to intercept the run-off water and thereby prevent the washing away of top-soil, while conserving much moisture.

Because the lay of the land in rolling country is very deceiving to the eye, the usual procedure of trying to keep the implement on the same level by judgment or guesswork is very unsatisfactory. Another procedure sometimes followed entails the laying out of the guide-lines with the aid of an engineer's level, but this method also is generally unsatisfactory on account of the time, expensive equipment and labor required, as well as the inaccuracy and difficulty sometimes encountered in cultivating between the contour guide-lines.

It is, therefore, an important object of the present invention to provide a level or grade indicating attachment for contour farming apparatus which will keep the operator of the apparatus constantly informed as to whether the apparatus is traveling on the level, uphill or downhill, and the rate of climb or descent.

Another object of the invention is to provide an attachment for contour farming apparatus including a pendulum-actuated control unit having an adjustable mounting and including a level-indicating register remote from but operated by the control unit through a flexible electrical conductor.

Still another object of the invention is to provide a pendulum-actuated control unit for contour farming apparatus including means for damping oscillations of the pendulum, such as caused by travel over rough ground.

A further object is to provide pendulum-actuated control unit and a telemeter indicating the state or condition of the control unit and wherein the means for damping oscillations of the pendulum, also serves as a switch element for the telemeter.

A still further object of the invention resides in the provision of a telemetric system having an electric circuit which is normally disconnected to conserve electrical energy.

Yet another object is to provide an adjustable friction bearing for shafts.

Other objects and advantages of the invention will be apparent from the following detailed description, taken in connection with the accompanying drawings, forming a part of this specification and in which drawings:

Figure 1 is a view in side elevation of contour farming apparatus and showing the level or grade-indicating attachment applied thereto.

Figure 2 is a fragmentary perspective view of the farming apparatus and the level-indicating attachment during use, and showing their relation to the operator.

Figure 3:
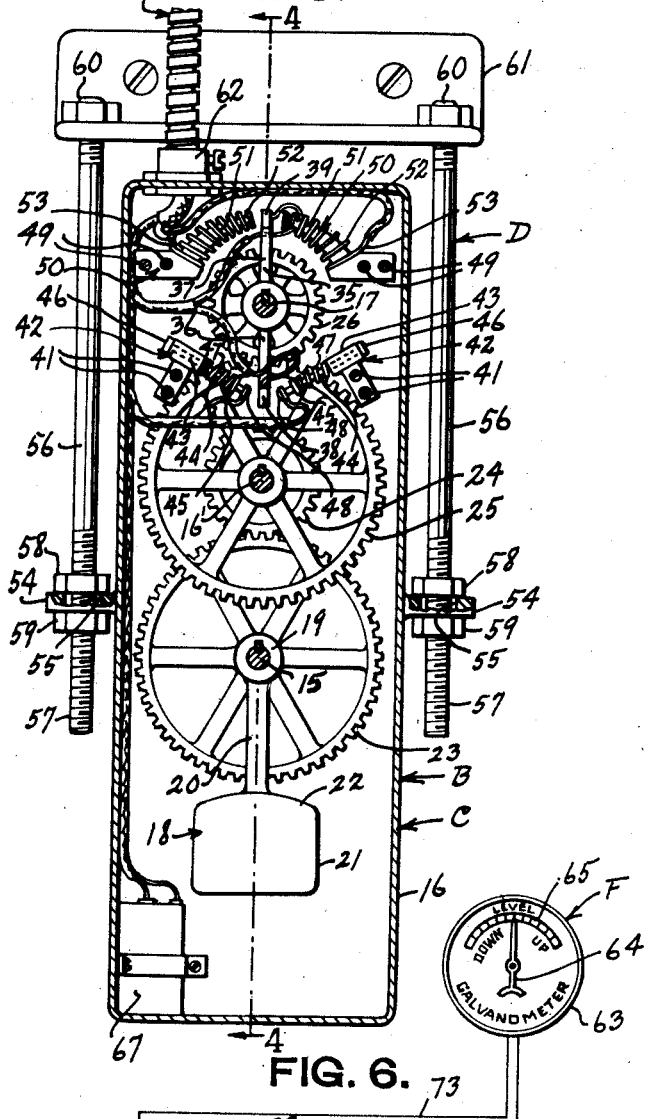
Figure 3 is a vertical longitudinal sectional view of a pendulum-actuated control unit and adjustable mounting forming a part of the level-indicating attachment.

In the drawings, which for the purpose of illustration show only a preferred embodiment of the invention, and wherein similar reference characters denote corresponding parts thruout the several views, A designated the contour farming apparatus, and B the level-indicating attachment comprising a pendulum-actuated control unit C having adjustable mounting means D, and connected, by a flexible electric conductor E to a telemeter F.

Referring first to the contour farming apparatus A, this may include a soil working implement of any suitable character and adapted to be moved over or thru the ground by any suitable power. In the present instance, the contour farming apparatus comprises a conventional farm tractor 10 including a frame 11, steering wheel 12, operator's seat 13, and a drawbar 14 to which is attached a conventional sulky plow 15', as shown in Figure 1.

Figure 4:
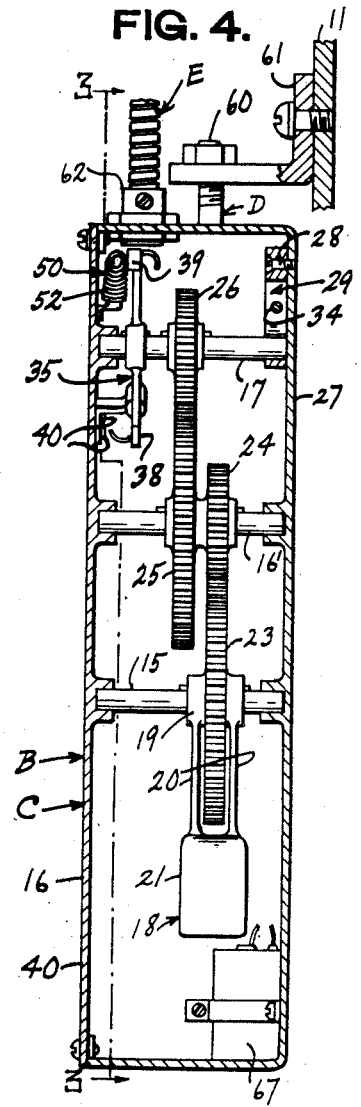
Figure 4 is a vertical transverse sectional view of the control unit and adjustable mounting therefor, substantially on the line 4—4 of Figure 3.

As to the level-indicating attachment B, the pendulum-actuated control unit C thereof is illustrated in detail in Figures 3 and 4. Suitably journaled in spaced horizontal relation within a box-like frame or housing 16 are shafts 15, 16' and 17, the first of which is keyed a pendulum 18 comprising a hub 19, pivotally carrying, as by a pair of spaced depending legs 20, a weight 21 substantially in the form of a right angular parallelopiped except that the upper surface 22 thereof preferably is convex. Rotatable with the hub 19 is a spur gear 23, disposed in a plane intermediate the legs 20, and meshing with a pinion gear 24, which, with a spur gear 25, is keyed to the shaft 16. These gears 24 and 25 may be integrally produced in the form of a cluster gear, as shown. Meshing with the spur gear 25 is a pinion gear 26 which is keyed to the shaft 17.

Figure 5:
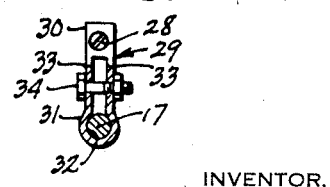
Figure 5 is a view partly in vertical section and partly in elevation of an adjustable friction bearing preferably forming a part of the pendulum-actuated control unit.

To the back wall 27 of the frame or housing is secured, as by a screw 28, an adjustable friction bearing 29 for the shaft 17. This friction bearing, as shown in Figure 5, comprises a block-like supporting portion 30 thru which the screw 28 extends, and a depending U-shaped hanger portion 31 of resilient strip material forming at its lower end portion a substantially semi-cylindrical bearing surface 32, for carrying the shaft 17, and at its upper end portion providing a pair of spaced-apart clamping strips 33. Extending through these clamping strips is a suitable headed bolt 34 for adjustably drawing the clamping strips toward each other, whereby to vary the frictional contact of the bearing surface 32 with the shaft 17.

Keyed to the shaft 17 is a lever or indicator control arm 35 including portions 36—37 at diametrically opposite sides of the shaft, these portions preferably being of dielectric material and provided at their extremities with electrical contacts 38—39, respectively. To the front wall 40 of the frame or housing is secured, as by screws 41, a pair of combined switching and pendulum oscillation damping devices 42, each disposed in spaced relation at an opposite side of the control arm portion 36. These devices 42 each including a cylindrical sleeve 43, in which is mounted a stem 44 slidable between heads or stops 45—46 and encircled by an expansion coil spring 47 disposed between the stop 45 and the cylindrical sleeve, so as to resiliently urge a suitably insulated electrical contact 48, secured to the head or stop 45, toward but not quite into engagement with the electrical contact 38 of the control arm 35 when the latter is in its normal vertical position as shown in Figure 3.

To the front wall 40 of the frame or housing is secured, as by screws 49, a pair of electrical resistance devices 50, each disposed in spaced relation at an opposite side of the control arm portion 37. In the present instance, these resistance devices each include an arcuate tapering support 51 for an encircling spiral resistance winding 52, arranged in the path of travel of the contact 39 of the control arm 35 and having a resistance which is relatively high at the inner end of the winding where the control arm 35 first makes contact, and of gradually decreasing resistance per unit length at its outer or terminal end 53.

Referring now to the adjustable mounting means D, a pair of projecting ears or lugs 54 is provided, each at an opposite side of the box-like housing. These lugs are each formed with a relatively large vertical opening 55, through which a hanger rod 56 loosely extends at its lower threaded end portion 57 and on which are threaded upper and lower adjusting nuts 58—59 respectively. At their upper end portions 60, the hanger rods 56 may be fixed to the frame or chassis of the contour farming apparatus in any suitable manner. If desired, the hanger rods 56 may be fixed to a bracket 61 carried by the frame 11 of the farm tractor 10.

Secured at one end as by a conventional connector 62, to the upper end of the box-like housing, is the flexible electric conductor E, which may be of the usual armored cable type, if desired. To the opposite end of the conductor E is secured the telemeter F, which may be a conventional galvanometer 63, including an index pointer 64 disposed at the center of its throw, and a scale 65, extending between the extremities of throw of the index pointer, so that the latter will indicate, by the direction and degree of its movement over the scale, the direction and amount of current flowing through the galvanometer. Preferably, the telemeter F is secured, as by a bracket 66, to the contour farming apparatus in front of the operator's seat or station, so as to be constantly visible during the contour farming operations. This face of the galvanometer may, if desired, be provided with indicia, such as the words "Down," "Level" and "Up," adjacent the left-hand end, the center, and the right-hand end of the scale, respectively, as shown in Figure 6.

A source of power 67, such as a dry cell, may be carried in the lower end of the box-like housing.

Figure 6:
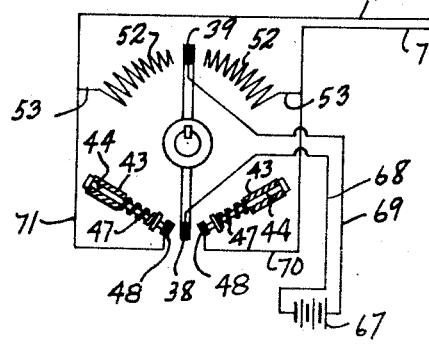
Figure 6 is a diagrammatic view of the telemetric system preferably forming a part of the level-indicating attachment.

Referring to Figure 6 of the drawings, the wiring system for the telemetric circuit includes conductors 68—69, between the source of power 67 and the contacts 38—39 respectively. Extending between the contacts 48 and the terminals 53 of the resistance windings 52 are conductors 70—71, respectively, including portions 72—73 extending each to an opposite pole of the galvanometer 63.

After the attachment has been secured to the contour farming apparatus, the pendulum-actuated control unit C may be adjusted by threading the nuts 58—59 upwardly or downwardly of the hanger rods 56 until the relationship of the pendulum with respect to the box-like frame is such that the control arm 35 will be positioned intermediate the resistances 52 and the combined switching and pendulum oscillation-damping contacts 48, when the contour farming apparatus is disposed on a stretch of ground known to be level. Under these conditions, no current will pass thru the electrical system and the pointer will rest at the center portion of the scale which is marked "Level."

When the farming apparatus starts downhill or uphill, the pendulum will remain vertical and will therefore pivot forwardly or backwardly relative to the frame, whereby to effect a similar but more pronounced forward or backward pivotal movement of the control arm 35 relative to the frame, due to the motion transmitting gearing between the pendulum and the control arm. This pivotal movement of the control arm will carry the contact 38 into engagement with one of the contacts 48 and will bring the contact 39 into engagement with one of the resistance windings 52, depending upon the direction of pivotal movement of the control arm 35. In either case a circuit will be established between the source of current 67 and the galvanometer 63, thru the contact 38 and one of the contacts 48 to one terminal of the galvanometer; and thru the contact 39 and one of the resistance windings 52 to the other terminal of the galvanometer. As the resistance of the windings 52 is relatively high at their inner ends where contact is first made, and gradually decreased per unit length toward the terminals 53, the galvanometer will register not only the very slight deviations from the level, at the center portion of the scale; but also the relatively greater deviations from the level, at the end portions of the scale.

It is, of course understood that swinging of the control arm 35 will, upon engagement of the contact 38 with one of the contacts 48, cause the stem on which the contact is mounted, to slide in its casing or sleeve 43, against the resistance of the spring 47 associated therewith. Because of the high gear ratio between the pendulum shaft 15 and the control arm shaft 17, and also because of the friction of the contact 39 with the resistance windings 52 and the resilient damping effect of the spring-urged contacts 48 in engagement with the contact 38, stabilization of the pendulum will result. In addition, undue oscillation or swinging of the pendulum may be neutralized by adjustment of the friction bearing 29 of the shaft 17. The foregoing pendulum-damping arrangement permits finer calibration of the galvanometer 63.

It will therefore be seen that an attachment is provided including a control unit and a meter, whereby the operator of a contour farming apparatus may, by watching the meter, which is mounted in plain sight, keep the farming apparatus close enough to the contour for all practical purposes. A preferred method of contouring, with farming apparatus on which the attachment is applied, is to run one line across the field, watching the meter closely, so as to produce an accurate contour line across the field; then run additional lines across the field upwardly and downwardly of the first line until these additional lines begin to deviate from the level; then run a new line in spaced adjacent relation to the ground just worked, watching the meter closely, so as to produce an accurate contour line across the field; then run additional lines across the field upwardly and downwardly of the new line until these lines begin to deviate from the level; and then contour farm any unworked land remaining between the two contoured strips, as by running a few short rows or lines to fill in any space between the contoured strips.

Various changes may be made to the form of invention herein shown and described, without departing from the spirit of the invention or the scope of the following claims.

I claim:

1. An automatic level-indicating instrument of the character described, a frame, an oscillatable pendulum pivoted to the frame, an oscillatable level indicator control arm pivoted to the frame, means transmitting oscillatory movements of the pendulum into proportionately amplified oscillatory movements of the arm, and resiliently yieldable abutments disposed in the path of travel of the oscillatable arm and each at an opposite side thereof, whereby to damp oscillatory movements of the pendulum with a resiliently yieldable strength which is increased by said means.

2. In a grade or level indicating mechanism, a frame, an oscillatable pendulum pivoted to the frame, an oscillatable level indicator control arm pivoted to the frame, means transmitting oscillatory movements of the pendulum relative to the frame into proportionately amplified oscillatory movements of the arm relative to the frame, and a pair of spaced damping devices disposed in the path of travel of the oscillatable arm and each at an opposite side thereof, each of said damping devices including a sleeve-like bearing fixed to the frame, a stem slidably mounted in the sleeve so that an end thereof will form a yielding abutment in the path of travel of the arm, and means urging the stem toward the arm.

3. In a grade or level indicating mechanism, the combination with a frame, of an oscillatable pendulum pivoted to the frame, a rheostat carried by the frame and including an oscillatable control arm, means transmitting oscillating movements of the pendulum relative to the frame, into oscillating movements of the control arm relative to the frame so as to vary the resistance of the rheostat, and a pair of resiliently yieldable contacts disposed in the path of travel of the control arm and at opposite sides thereof, whereby to damp said oscillatory movements of the pendulum, said control arm including a contact arranged to engage one of said yieldable contacts upon movement of said control arm in a given direction relative to the frame.

4. In a grade or level indicating mechanism, the combination with a support, of a pendulum pivoted to the support, a rheostat having an oscillatable control arm, means transmitting oscillating movements of the pendulum relative to the support, into oscillating movements of the control arm so as to vary the resistance of the rheostat upon variation of the relative positions of the pendulum and its support, and a pair of resiliently yieldable contacts disposed in the path of travel of the control arm and at opposite sides thereof, whereby to damp said oscillatory movements of the pendulum, said control arm including a contact arranged to engage one of said yieldable contacts upon movement of said control arm in a given direction.

LEO E. MEENAN.